(12) United States Patent
Moriyama (10) Patent No.: US 11,785,159 B2
(45) Date of Patent: Oct. 10, 2023

(54) IMAGE PROCESSING APPARATUS AND METHOD OF CONTROLLING THE IMAGE PROCESSING APPARATUS TO DETECT OBJECTS AND SWITCH A POWER MODE

(71) Applicant: SEIKO EPSON CORPORATION, Tokyo (JP)

(72) Inventor: Satoshi Moriyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/664,794

(22) Filed: May 24, 2022

(65) Prior Publication Data

US 2022/0377195 A1 Nov. 24, 2022

(30) Foreign Application Priority Data

May 24, 2021 (JP) .................. 2021-086730

(51) Int. Cl.
*H04N 1/00* (2006.01)

(52) U.S. Cl.
CPC ..... *H04N 1/00896* (2013.01); *H04N 1/00129* (2013.01); *H04N 1/00259* (2013.01)

(58) Field of Classification Search
CPC .................................. H04N 1/00896
See application file for complete search history.

(56) References Cited

U.S. PATENT DOCUMENTS

| 9,600,054 | B2 * | 3/2017 | Ono | G06F 1/3284 |
| 9,832,325 | B2 * | 11/2017 | Nagasawa | H04N 1/00084 |
| 2012/0127538 | A1 * | 5/2012 | Mamiya | H04N 1/00891 323/318 |
| 2013/0120779 | A1 * | 5/2013 | Baba | G06F 1/325 358/1.13 |
| 2013/0258424 | A1 * | 10/2013 | Ono | H04N 1/00323 358/475 |
| 2014/0119766 | A1 * | 5/2014 | Kuroda | G03G 21/206 399/88 |
| 2014/0281631 | A1 * | 9/2014 | Asano | G06F 1/3231 713/323 |
| 2015/0012769 | A1 * | 1/2015 | Koga | G06F 3/1229 713/323 |

(Continued)

FOREIGN PATENT DOCUMENTS

JP 2012-114499 6/2012

*Primary Examiner* — Benjamin O Dulaney
(74) *Attorney, Agent, or Firm* — WORKMAN NYDEGGER (57) ABSTRACT

An image processing apparatus includes a print section configured to perform printing on a recording medium, a first detector configured to detect a moving object within a first detection range, a second detector configured to detect the moving object within a second detection range, and a controller configured to switch between a normal mode in which printing by the print section is enabled and a power-saving mode in which printing by the print section is disabled. The controller returns to the normal mode when, after the controller enters the power-saving mode, in response to detection of the moving object by the first detector or the second detector, the first detector or the second detector detects the moving object for a first predetermined period of time or more, and the first detector and the second detector detect the moving object for a second predetermined period of time or more.

7 Claims, 6 Drawing Sheets

(56) References Cited

U.S. PATENT DOCUMENTS

| | | | | |
|---|---|---|---|---|
| 2018/0267592 A1* | 9/2018 | Nagasawa | .......... | H04N 1/00896 |
| 2021/0195035 A1* | 6/2021 | Okazaki | ............. | H04N 1/00087 |
| 2021/0227088 A1* | 7/2021 | Watanabe | .......... | H04N 1/00352 |
| 2021/0306947 A1* | 9/2021 | Koizumi | ................ | G06F 1/3284 |
| 2022/0294918 A1* | 9/2022 | Kyogoku | ............. | H04N 1/0049 |

* cited by examiner

IMAGE PROCESSING APPARATUS AND METHOD OF CONTROLLING THE IMAGE PROCESSING APPARATUS TO DETECT OBJECTS AND SWITCH A POWER MODE

The present application is based on, and claims priority from JP Application Serial Number 2021-086730, filed May 24, 2021, the disclosure of which is hereby incorporated by reference herein in its entirety.

BACKGROUND

1. Technical Field

The present disclosure relates to an image processing apparatus and a method of controlling the image processing apparatus.

2. Related Art

As discussed in, for example, JP-A-2012-114499, an apparatus that detects people by using two motion sensors having different detection distances and returns from a power-saving mode is known.

Such an apparatus, however, fails to reliably determine that a person approaching the apparatus is likely to use the apparatus or is likely to just pass by the apparatus, and thus the apparatus cannot properly return from a power-saving mode to a normal mode.

SUMMARY

According to an aspect of the present disclosure, an image processing apparatus includes a print section configured to perform printing on a recording medium, a first detector configured to detect a moving object within a first detection range, a second detector configured to detect the moving object within a second detection range, and a controller configured to switch between a normal mode in which printing by the print section is enabled and a power-saving mode in which printing by the print section is disabled. The controller returns to the normal mode when, after the controller enters the power-saving mode, in response to detection of the moving object by the first detector or the second detector, the first detector or the second detector detects the moving object for a first predetermined period of time or more, and the first detector and the second detector detect the moving object for a second predetermined period of time or more.

According to another aspect of the disclosure, a method of controlling an image processing apparatus including a print section configured to perform printing on a recording medium, a first detector configured to detect a moving object within a first detection range, and a second detector configured to detect the moving object within a second detection range is provided. The method includes entering a power-saving mode in which printing by the print section is disabled, after detection of the moving object by the first detector or the second detector, the first detector or the second detector detecting the moving object for a first predetermined period of time or more, and in response to the first detector and the second detector detecting the moving object for a second predetermined period of time or more, entering a normal mode in which printing by the print section is enabled.

DESCRIPTION OF EXEMPLARY EMBODIMENTS

Hereinafter, embodiments of an image processing apparatus 1 will be described with reference to the accompanying drawings. A three-dimensional coordinate system is used to indicate directions in the drawings. For the sake of simplicity, a positive Z-axis direction denotes upward or simply up, a negative Z-axis direction denotes downward or simply down, a positive X-axis direction denotes rightward or simply right and a negative X-axis direction denotes leftward or simply left, a positive Y-axis direction denotes rearward or simply rear, and a negative Y-axis direction denotes forward or simply front.

1. First Embodiment 1-1. Structure of Image Processing Apparatus

Figure 1:
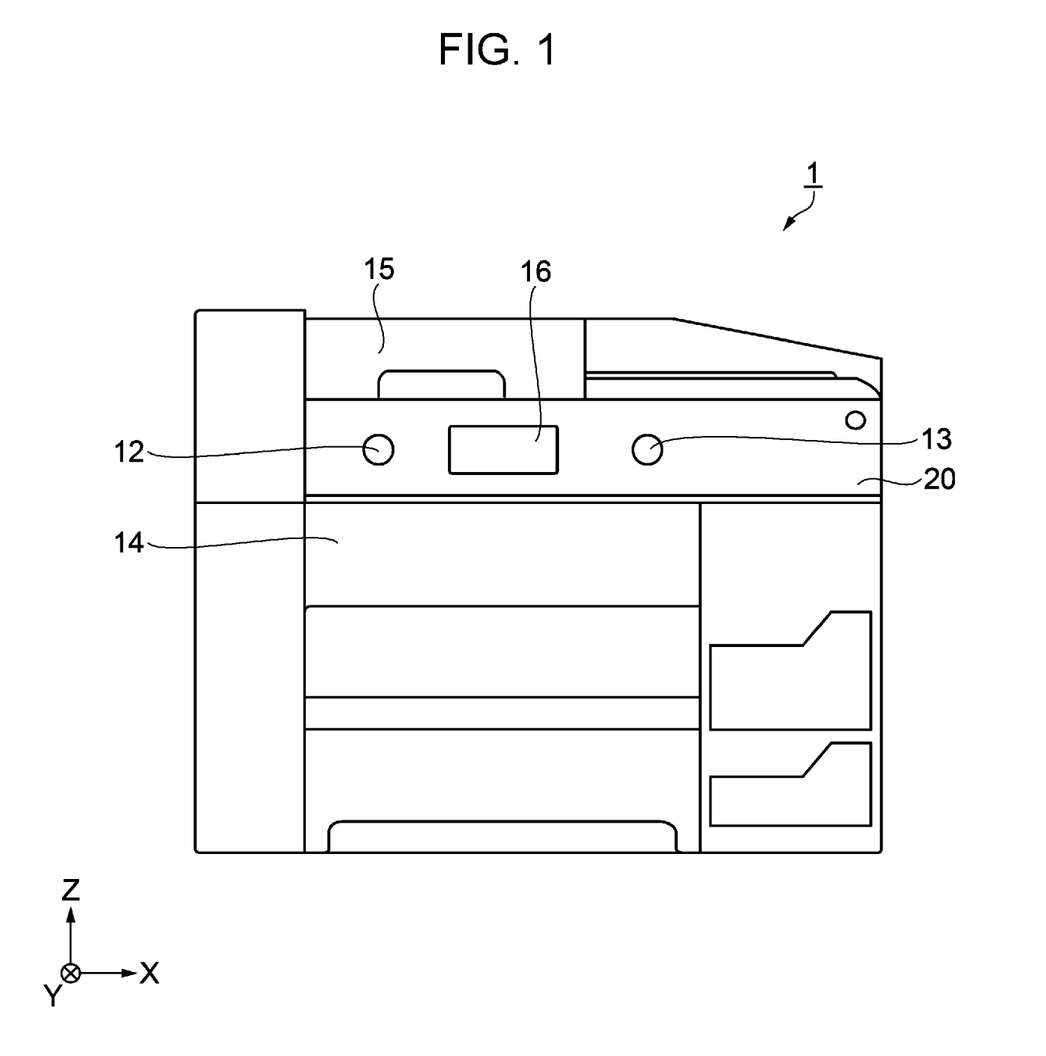
FIG. 1 is an external view of an image processing apparatus.

The image processing apparatus 1 according to the embodiment includes a user interface section (hereinafter, referred to as a UI section) 16 disposed on the front of the image processing apparatus 1 in a central portion of a case 20, as illustrated in FIG. 1. A user, that is, a moving object approaches the UI section 16 to visually check and operate the UI section 16. A first detector 12 is disposed on the side to the left of the UI section 16 and a second detector 13 is disposed on the side to the right of the UI section 16 to detect a user approaching the image processing apparatus 1. A print section 14 is disposed below the UI section 16, and a reading section 15 is disposed above the UI section 16.

Figure 2:
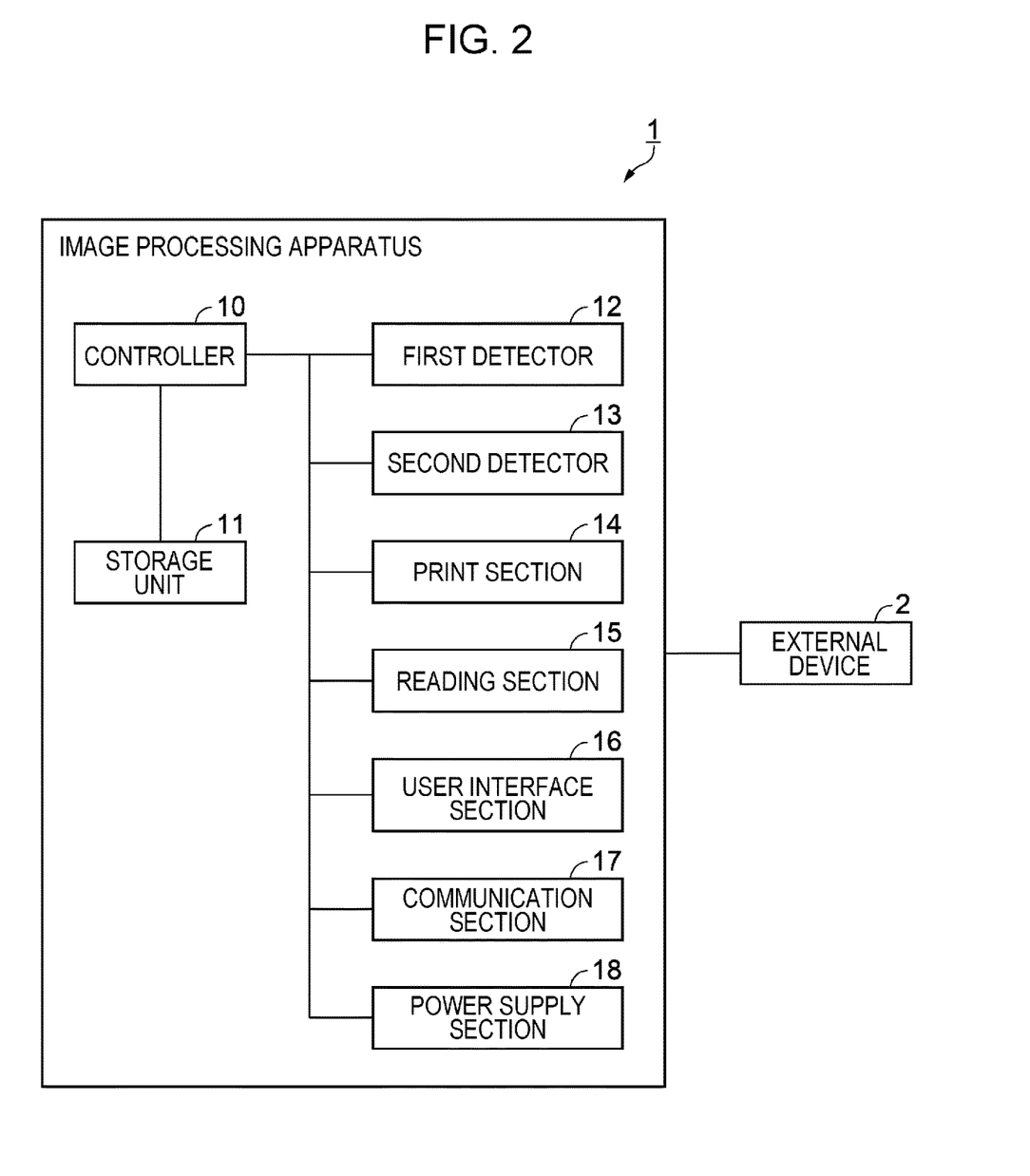
FIG. 2 is a block diagram illustrating a configuration of an image processing apparatus.

The image processing apparatus 1 includes a controller 10, a storage unit 11, the first detector 12, the second detector 13, the print section 14, the reading section 15, the UI section 16, a communication section 17, and a power supply section 18 as illustrated in FIG. 2. These components will be specifically described below.

The controller 10 includes a central processing unit (CPU) that performs overall control of the components in the image processing apparatus 1, a timer that measures time, a universal asynchronous receiver transmitter (UART) that manages input and output, and a field programmable gate array (FPGA) and a programmable logic device (PLD), which are logic circuits. The CPU is also referred to as a processor. The storage unit 11 includes a flash read-only memory (ROM), which is rewritable nonvolatile memory, and random access memory (RAM), which is volatile memory. The CPU in the controller 10 reads a program, such as firmware, stored in the flash ROM in the storage unit 11 and executes the program by using the RAM in the storage unit 11 as a work area. The timer in the controller 10 has a target count value that is set by the CPU in advance. In response to input of an input signal or an enable signal to an input terminal, the timer starts counting and continues the counting while the enable signal is input, and when the counting reaches the preset count value, the timer outputs an output signal from an output terminal. After the output, the timer resets the counting. In this embodiment, the enable signal input to the input terminal of the timer is the positive logic (High Active) and is at the high level of a logic voltage.

Each of the first detector 12 and the second detector 13 is a sensor capable of detecting a moving object and may be, for example, a sensor in the following example. An example of the sensor is a motion sensor that detects infrared rays of 10 μm emitted by a human body when a moving object is a user, that is, a person. The detection distance of the motion sensor can be adjusted to be, for example, within 3 m by adjusting a mounted lens.

In another example, the sensor may be a far-infrared sensor that is provided with a light emitter for emitting far infrared rays and a light receiver for receiving the far infrared rays. When no moving object is present, far infrared rays emitted by the light emitter are not received by the light receiver, whereas when a moving object is present, the rays are reflected by the moving object and are received by the light receiver, and thereby the moving object is detected. The detection distance of the far-infrared sensor can be adjusted to be, for example, within 50 cm by adjusting a lens that is mounted on the light emitter or the light receiver.

In still another example, the sensor may be an ultrasonic sensor that is provided with a transmitter for emitting ultrasound at frequencies from 30 kHz to 10 MHz and a receiver for receiving the ultrasound. When no moving object is present, ultrasound emitted by the transmitter is reflected by a wall in a room, whereas when a moving object is present, the ultrasound is reflected by the moving object and is received by the receiver. The time from emission of ultrasound to reception of the ultrasound changes when a moving object is present, and thereby the ultrasonic sensor detects the moving object. The detection distance of the ultrasonic sensor can be adjusted to be, for example, within 5 m by adjusting the volume of ultrasound to be emitted.

It should be noted that the range detectable by these sensors, such as the angular view, may be adjusted by, for example, shielding surrounding areas of components of the sensors by using resin or the like to partially shield infrared rays or ultrasound. The first detector 12 and the second detector 13 may be the same sensors or any combination of the above-described example sensors. The far-infrared sensor and the ultrasonic sensor can detect moving objects other than human bodies, such as robots.

The UI section 16 is, for example, a touch panel display. The UI section 16 includes a display panel, which is a display section that displays a variety of information, and a detection panel, which is an input section. The detection panel is layered on the display panel. The detection panel detects a user's finger operation in accordance with a method such as a capacitive method, a resistive film method, or an optical method. The display section of the UI section 16 displays a "PRINT" button, a "COPY" button, and a "SCAN" button for users to select a function from a print function, a copy function, and a scan function, which will be described below. The controller 10 detects a button touched by a user via the detection panel of the UI section 16 and executes the selected function.

The print section 14 includes a transport mechanism for transporting paper from a sheet feed tray, an ink jet head for causing an ink to adhere to the transported paper for printing, and a print mechanism such as a cartridge for storing the ink. The transport mechanism includes a mechanism for reversing paper. The print section 14 performs printing on one side of a paper sheet by using the head, reverses the paper sheet by using the transport mechanism, and performs printing on the other side of the paper sheet by using the head, thereby performing printing on both sides of the paper sheet.

The print section 14 performs printing by using paper and ink. Paper may be plain paper, recycled paper, photographic paper, or synthetic paper containing resin. Ink may be, for example, four colors of inks (black, yellow, magenta, and cyan). The controller 10 controls the head in the print section 14 such that full-color printing is performed by using four colors of inks.

The reading section 15 includes a document transport mechanism for transporting a document mounted on a document positioning plate and a reading mechanism, such as a color image sensor, for emitting light to a transported document and receiving the reflected light to read the document as scan data separated into red, green, and blue (RGB). The document transport mechanism includes a mechanism for reversing paper sheets, and the color image sensor is capable of reading both sides of a document.

The controller 10 has a scan function for reading a document by using the reading section 15 to acquire scan data. In response to detecting an input via the "SCAN" button on the detection panel of the UI section 16, the controller 10 reads a document by using the reading section 15 to acquire scan data and transmits the scan data to an external device 2 via the communication section 17, which will be described below.

The controller 10 has a copy function for converting scan data that has been read by the reading section 15 into colors of the inks and printing the converted data by using the print section 14. In response to detecting an input via the "COPY" button on the detection panel of the UI section 16, the controller 10 reads a document by using the reading section 15 to acquire scan data, converts the scan data into colors of the inks, and prints the converted data by using the print section 14.

The communication section 17 includes a circuit capable of performing wired or wireless communication with the external device 2, such as a computer. The communication section 17 receives a print job from the external device 2. The communication section 17 transmits information, such as error information when an error occurs and scan data, to the external device 2. The controller 10 has a print function for printing a print job received by the communication section 17 by using the print section 14. In response to detecting an input via the "PRINT" button on the detection panel of the UI section 16, the controller 10 prints a print job received from the external device 2 by the communication section 17 by using the print section 14.

The power supply section 18 includes a power supply circuit that outputs, for example, voltages of 3.3 V, 5 V, and 24 V from a commercial power supply. The power supply section 18 is capable of supplying power to components in the image processing apparatus 1 under the control of the controller 10. More specifically, the power supply section 18 supplies a voltage of 24 V to components that have actuators, such as the print section 14 and the reading section 15, to operate the components under the control of the controller 10. The power supply section 18 supplies a voltage of 3.3 V and a voltage of 5 V to logic circuits, such as the controller 10, the storage unit 11, the first detector 12, the second detector 13, the UI section 16, and the communication section 17, to operate the components under the control of the controller 10.

1-2. Normal Mode and Power-Saving Mode

Examples of a normal mode and a power-saving mode in the image processing apparatus 1 are described. The CPU in the controller 10 is capable of switching modes including a Run mode, a Sleep mode, a Stop mode, and a Standby mode in descending order of power consumption, when power supply to the image processing apparatus 1 is active. The controller 10 is capable of performing control such that the controller 10 switches between any of the modes. The respective modes are described in detail below.

In the Run mode, the CPU, the UART, and the RAM in the storage unit 11 all operate. The Run mode is a normal mode in which the CPU is capable of performing normally. In the Sleep mode, the CPU is inactive, and the UART and the RAM in the storage unit 11 operate. In the Stop mode, the CPU and the UART are inactive, and the RAM in the storage unit 11 performs only data storage. In the Standby mode, the CPU, the UART, and the RAM in the storage unit 11 are all inactive.

The Sleep mode, the Stop mode, and the Standby mode are power-saving modes in which at least the CPU is inactive so that performance to reduce power consumption compared with the Run mode can be regulated. When the CPU causes the UART and the RAM to be inactive, the power consumption can be further reduced.

In the normal mode or the Run mode, the CPU is active, and the controller 10 controls the print section 14 to enable printing and controls the reading section 15 to enable scanning. In such a case, the controller 10 can also control the power supply section 18 such that a voltage of 24 V is supplied to components having actuators and a voltage of 3.3 V and a voltage of 5 V are supplied to logic circuits to enable the print function, the scan function, and the copy function to be performed.

In contrast, in the Sleep mode, the Stop mode, or the Standby mode, that is, in a power-saving mode, the CPU is inactive, and thus the controller 10 cannot control the print section 14 to perform printing and cannot control the reading section 15 to perform scanning. Accordingly, the controller 10 can reduce power consumption, including the power consumption of the CPU. Under such control, the controller 10 may also control the power supply section 18 such that the supply of a voltage of 24 V to the components having the actuators is stopped, thereby further reducing power consumption. The controller 10 may also stop the power supply of 3.3 V and 5 V to the UART and the RAM to inactivate the UART and the RAM, respectively, thereby further reducing power consumption. The controller 10 supplies voltages of 3.3 V and 5 V to the timer in the controller 10 by using the power supply section 18 to enable the timer to perform counting even in a power-saving mode.

The controller 10 is capable of switching from the normal mode to the power-saving mode when no user touch operation on any of the "PRINT", "COPY", and "SCAN" buttons is detected by the detection panel in the UI section 16 for a predetermined time. The controller 10 is also capable of switching from the normal mode to the power-saving mode when no print job is received by the communication section 17 for a predetermined time. As described above, the controller 10 switches to the power-saving mode to reduce power consumption when determining that it is not necessary to operate the print section 14 and the reading section 15 for a while.

Next, interrupt processing of the CPU in the controller 10 is described. An output terminal of the timer in the controller 10 is coupled to an interrupt terminal of the CPU in the controller 10. The CPU is inactive in the power-saving mode. When the CPU is in the power-saving mode, in response to the timer counting to a preset count value and outputting an output signal as an interrupt signal from the output terminal to the interrupt terminal of the CPU, the CPU returns from the power-saving mode and starts interrupt processing. The CPU is capable of performing control for returning from the power-saving mode to the normal mode in the interrupt processing. In this embodiment, the interrupt signal sent to the interrupt terminal of the CPU that starts the interrupt processing is the positive logic and is at the high level of a logic voltage. It should be noted that the controller 10 tends to take more time to return from the power-saving mode to the normal mode in a power-saving mode that consumes less power. This is because it takes more time to initialize the CPU, the UART, the RAM, and other components or to restore initial settings of the CPU, the UART, the RAM, and other components.

Next, an example of control of the power supply section 18 to be performed by the controller 10 in the normal mode and in the power-saving mode is described in detail. In the normal mode, the controller 10 controls the power supply section 18 such that electric power is supplied to the print section 14 and the reading section 15 to enable the print section 14 to perform printing and to enable the reading section 15 to perform scanning. In the power-saving mode, the controller 10 is capable of controlling the power supply section 18 such that electric power is supplied to the reading section 15 but is not supplied to the print section 14, or electric power is not supplied to either of the reading section 15 or the print section 14. The controller 10 is capable of not supplying electric power to at least the print section 14 to disable printing in the power-saving mode.

In the power-saving mode, the controller 10 may control the power supply section 18 so as to stop power supply to the print section 14 or the reading section 15, which consumes more standby power or is less likely to be operated, or so as to stop power supply to both the print section 14 and the reading section 15. When the controller 10 stops power supply to both the print section 14 and the reading section 15, the controller 10 can enter a power-saving mode that consumes less standby power than a mode in which power supply to the print section 14 or the reading section 15 is stopped. In such a case, however, the controller 10 may take more time to return to the normal mode because the controller 10 needs to supply power to both sections.

1-3. Detection Range

Figure 3:
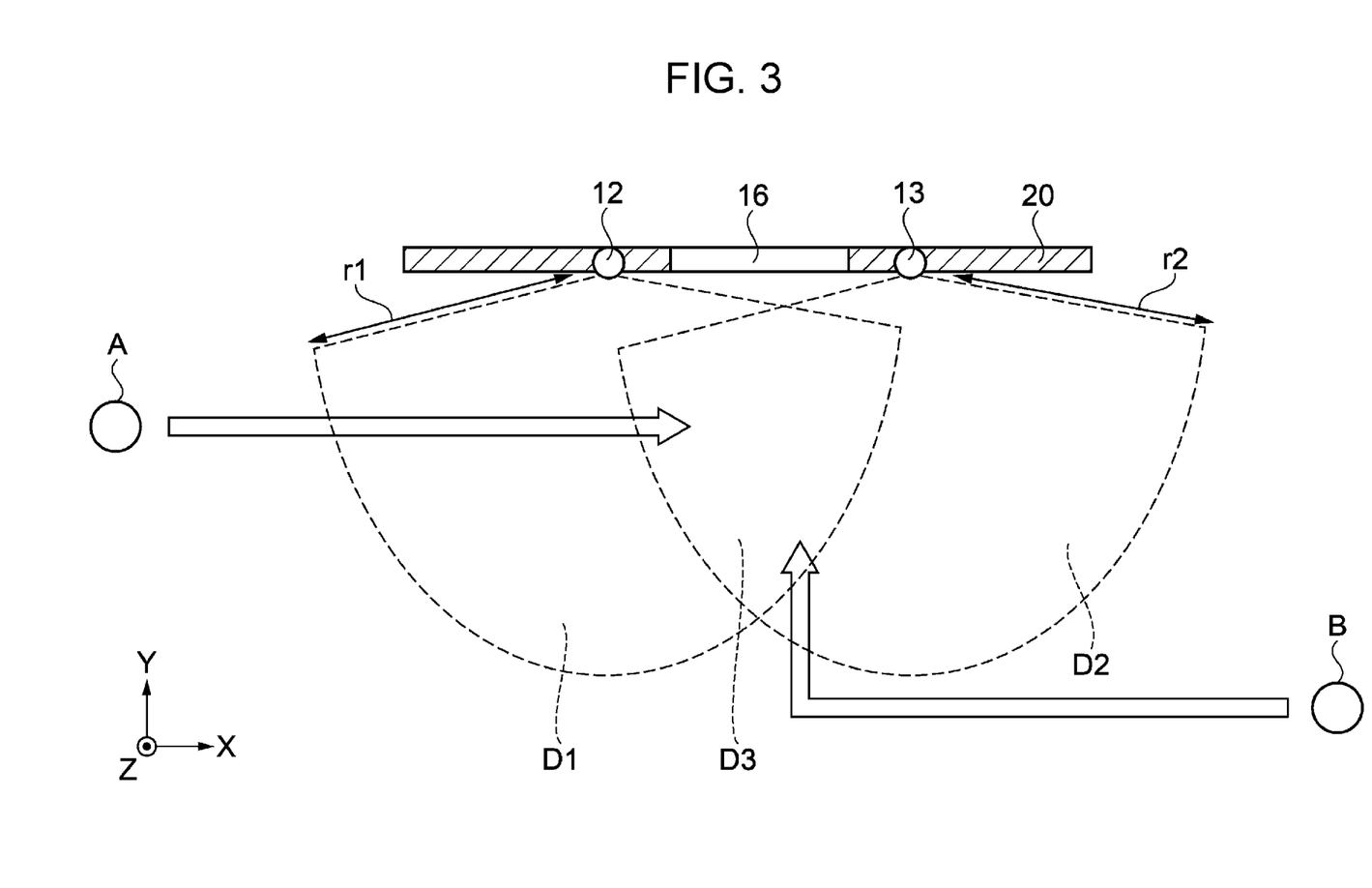
FIG. 3 illustrates detection ranges of a first detector and a second detector.

FIG. 3 illustrates the image processing apparatus 1 viewed from the top. The UI section 16 is disposed in a central portion of the case 20 covering the front of the image processing apparatus 1. The first detector 12 and the second detector 13 are disposed on the side to the left of and on the side to the right of the UI section 16, respectively. The first detector 12 and the second detector 13 are disposed at positions where the detectors 12 and 13 can readily detect a moving object, which is a user approaching the UI section 16 of the image processing apparatus 1 to visually check and operate the UI section 16. In FIG. 3, dotted lines illustrate detection ranges in which the first detector 12 and the second detector 13 can detect a moving object. Trajectories of a moving object A and a moving object B are indicated by thick arrows.

The first detector 12 is disposed on the side to the left of the UI section 16. A first detection distance r1 is a distance within which the first detector 12 can detect a moving object. A first detection range D1, within which the first detector 12 can detect a moving object, is a fan-shaped range with a radius r1 subtending the first detector 12. The second detector 13 is disposed on the side to the right of the UI section 16. A second detection distance r2 is a distance within which the second detector 13 can detect a moving object. A second detection range D2, within which the second detector 13 can detect a moving object, is a fan-shaped range with a radius r2 subtending the second detector 13. An overlap detection range D3 is a range in which the first detection range D1 of the first detector 12 overlaps the second detection range D2 of the second detector 13. In the overlap detection range D3, both the first detector 12 and the second detector 13 can detect a moving object.

An example of detection of a moving object A performed by the first detector 12 and the second detector 13 as the moving object A moves, as illustrated in FIG. 3, is described. It is assumed that the moving object A is outside the first detection range D1 and the second detection range D2 before the moving object A starts to move. The moving object A moves from left to right in front of the image processing apparatus 1. In response to the moving object A moving from outside of the first detection range D1 into the first detection range D1, the movement is first detected by the first detector 12. In response to the first detector 12 detecting the moving object A for a predetermined period of time, the controller 10 determines that the moving object A is likely to approach and use the image processing apparatus 1.

In response to the moving object A further moving to the right and entering the overlap detection range D3, the moving object A is detected by both the first detector 12 and the second detector 13. In this state, the location of the moving object A is in the vicinity of the UI section 16 and in a central area in front of the image processing apparatus 1. In response to the first detector 12 and the second detector 13 detecting the moving object A for a predetermined period of time, the controller 10 determines that the moving object A is more likely to approach, visually check, and operate the UI section 16 of the image processing apparatus 1 and is more likely to use the image processing apparatus 1.

Next, an example of detection of a moving object B performed by the first detector 12 and the second detector 13 as the moving object B moves is described. It is assumed that the moving object B is outside the first detection range D1 and the second detection range D2 before the moving object B starts to move. The moving object B first moves from the right to the left at a predetermined distance to the image processing apparatus 1. During the movement, the moving object B is outside the second detection range D2 of the second detector 13 and is not detected by the second detector 13. The moving object B then changes direction and moves toward the image processing apparatus 1. In response to the moving object B moving from outside of the second detection range D2 of the second detector 13 into the second detection range D2, the movement is first detected by the second detector 13. In response to the second detector 13 detecting the moving object B for a predetermined period of time, the controller 10 determines that the moving object B is likely to approach and use the image processing apparatus 1.

In response to the moving object B further moving toward the image processing apparatus 1 and entering the overlap detection range D3, the moving object B is detected by both the first detector 12 and the second detector 13. In this state, the location of the moving object B is in the vicinity of the UI section 16 and in a central area in front of the image processing apparatus 1. In response to the first detector 12 and the second detector 13 detecting the moving object B for a predetermined period of time, the controller 10 determines that the moving object B is more likely to approach, visually check, and operate the UI section 16 of the image processing apparatus 1 and is more likely to use the image processing apparatus 1. As described above, by using the first detector 12 and the second detector 13, the image processing apparatus 1 can more reliably determine that a moving object approaching the image processing apparatus 1 is likely to use the image processing apparatus 1 or is likely to just pass by the image processing apparatus 1.

1-4. Example 1 of Returning from Power-Saving Mode to Normal Mode

The controller 10 is in the normal mode after power is switched on, and the controller 10 performs an initialization operation on the print section 14 and the reading section 15. In this embodiment, a first timer and a second timer are used as the timer in the controller 10. Each timer may be used in combination with a predetermined logic circuit in the controller 10. When the first timer and the second timer are used, the controller 10 presets a count value th1, which is a first predetermined time period, for the first timer and presets a count value th2, which is a second predetermined time period, for the second timer.

Figure 4:
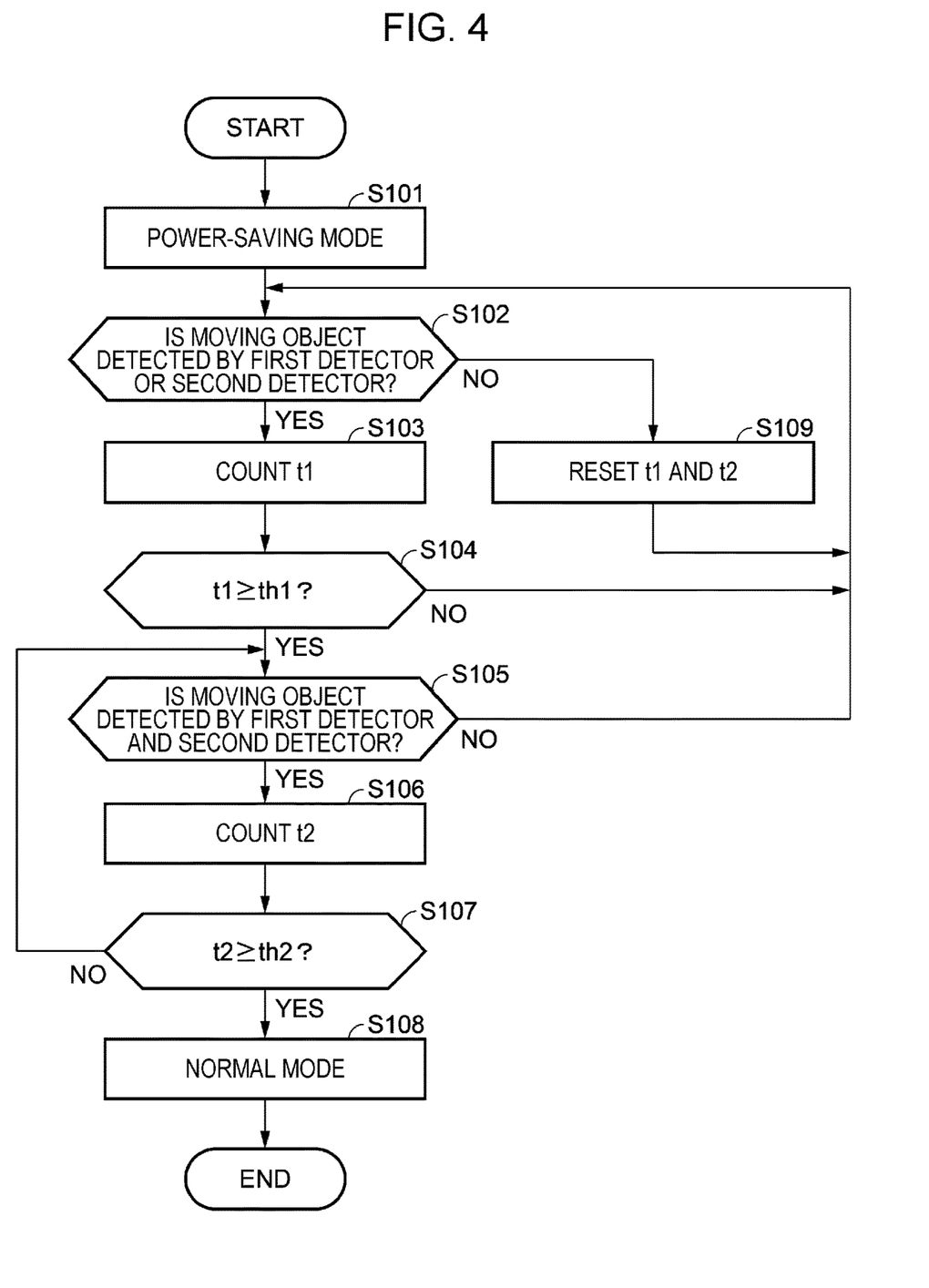
FIG. 4 is a flowchart illustrating processing for returning from a power-saving mode to a normal mode.

In the following description of the example in FIG. 4, the description of the controller 10 starts from a state in which the controller 10 is in the normal mode. As illustrated in FIG. 4, the controller 10 switches from the normal mode to a power-saving mode when no operation on the buttons on the detection panel of the UI section 16 is detected for a predetermined time or no print job is received by the communication section 17 for a predetermined time (S101). It is assumed that during the processing, the controller 10 determines that no moving object is detected by the first detector 12 or the second detector 13. When a moving object has been detected by the first detector 12 or the second detector 13, the controller 10 may remain in the normal mode.

In this example, it is assumed that the CPU in the controller 10 is in the Sleep mode, the Stop mode, or the Standby mode as a power-saving mode. The controller 10 controls the power supply section 18 such that power supply is stopped to both the reading section 15 and the print section 14. By the processing, the controller 10 disables the operations of the print section 14 and the reading section 15. As a result, the controller 10 can reduce power consumption in the image processing apparatus 1.

The controller 10 determines whether a moving object is detected by the first detector 12 or the second detector 13 (S102). In response to detection of a moving object by the first detector 12 or the second detector 13 (S102: YES), the controller 10 reads a count value t1 by using the first timer (S103). The count value t1 indicates a time period for which the first detector 12 or the second detector 13 has been detecting the moving object. When no moving object is detected by the first detector 12 or the second detector 13 (S102: NO), the first timer resets the count value t1 and a count value t2, which will be described below, when the count value t1 and the count value t2 have already been established (S109), and the processing returns to the control for determining whether a moving object is detected by the first detector 12 or the second detector 13 (S102).

In an example configuration for implementing the processing, the controller 10 performs a logical OR operation on a detection signal of the first detector 12 and a detection signal of the second detector 13 to generate an enable signal by using a first logic circuit in a predetermined logic circuit and inputs the enable signal to an input terminal of the first timer in the controller 10. It should be noted that the detection signal generated when the first detector 12 or the second detector 13 detects a moving object is at the high level of the logic voltage. More specifically, when the first detector 12 or the second detector 13 detects a moving object, the first logic circuit performs the logical OR operation on the detection signals, and when the result is at the high level, the controller 10 determines that the result of the logical OR operation is at the high level and inputs the output result, which is at the high level, as an enable signal to the first timer. The first timer starts counting of the count value t1 in response to an input of the enable signal to the input terminal, and while the enable signal is input, the first timer continues the counting measure time.

The first timer compares the count value t1 with the count value th1, which is preset as described above (S104). In response to the first timer determining that the established count value t1 has reached the preset count value th1 and the count value t1≥the count value th1 (S104: YES), the controller 10 determines whether both of the first detector 12 and the second detector 13 have detected the moving object (S105).

The first timer in the controller 10 is capable of determining whether the first detector 12 or the second detector 13 has been detecting a moving object continuously for a period of time greater than or equal to the count value th1. The controller 10 is capable of determining that a moving object has been present in the vicinity of the image processing apparatus 1 for a period of time greater than or equal to the count value th1, thereby more reliably determining that the moving object is likely to use the image processing apparatus 1. When the first detector 12 or the second detector 13 detects that a moving object has moved for a period of time less than the count value th1, the first timer in the controller 10 more reliably determines that the moving object is less likely to use the image processing apparatus 1, for example, the moving object has just passed by in front of the image processing apparatus 1.

In response to detection of the moving object by the first detector 12 and the second detector 13 (S105: YES), the controller 10 reads the count value t2 by using the second timer (S106). The count value t2 indicates a time period for which the first detector 12 and the second detector 13 have been detecting the moving object.

In an example configuration for implementing the processing, the controller 10 performs a logical AND operation on three signals, that is, an output signal of the first timer, a detection signal of the first detector 12, and a detection signal of the second detector 13, to generate an enable signal by using a second logic circuit in a predetermined logic circuit and inputs the enable signal to an input terminal of the second timer in the controller 10. It should be noted that the output signal generated by the first timer when the count value t1≥the count value th1 is at the high level of the logic voltage. More specifically, in a state in which the first timer determines that the count value t1≥the count value th1, and when the first detector 12 and the second detector 13 detect a moving object, the second logic circuit performs the logical AND operation on the signal output by the first timer and the detection signals. When the result is at the high level, the second logic circuit determines that the result of the logical AND operation is at the high level and inputs the output result, which is at the high level, as an enable signal to the second timer. The second timer starts counting the count value t2 in response to an input of the enable signal to the input terminal, and while the enable signal is input, the second timer continues the counting measure time.

In response to the first timer determining that the established count value t1 has not reached the preset count value th1 and the count value t1<the count value th1 (S104: NO), the processing returns to the control for determining whether a moving object is detected by the first detector 12 or the second detector 13 (S102). In response to the first timer determining that the established count value t1 has reached the preset count value th1 and the count value t1≥the count value th1 (S104: YES), when the controller 10 determines that the moving object is not detected by the first detector 12 and the second detector 13 (S105: NO), the processing returns to the control for determining whether a moving object is detected by the first detector 12 or the second detector 13 (S102).

The second timer compares the count value t2 with the count value th2, which is preset as described above (S107). In response to the second timer determining that the established count value t2 has reached the preset count value th2 and the count value t2≥the count value th2 (S107: YES), the CPU in the controller 10 returns from the power-saving mode to the normal mode, which is the Run mode (S108). Then, the controller 10 terminates the control. When the controller 10 returns from the power-saving mode to the normal mode, the first detector 12 or the second detector 13, that is, the one that has first detected a moving object, has detected the moving object continuously from the first detection range D1 or the second detection range D2 including the overlap detection range D3.

In an example configuration for implementing the processing, the second timer inputs an output signal as an interrupt signal to an interrupt terminal of the CPU in the controller 10. More specifically, when the second timer determines that the count value t2≥the count value th2, the second timer outputs an output signal as an interrupt signal to an interrupt terminal of the CPU to cause the CPU to perform interrupt processing. The CPU performs the interrupt processing, thereby performing control for returning from the Sleep mode, the Stop mode, or the Standby mode, which are power-saving modes, to the Run mode, which is the normal mode.

In response to the second timer determining that the established count value t2 has not reached the preset count value th2 and the count value t2<the count value th2 (S107: NO), the processing returns to the control for determining whether the moving object is detected by both the first detector 12 and the second detector 13 (S105).

The second timer in the controller 10 is capable of determining whether the first detector 12 and the second detector 13 have detected the moving object continuously for a period of time greater than or equal to the count value th2. The controller 10 is capable of determining that the moving object has been present in the vicinity of the UI section 16 of the image processing apparatus 1 for a period of time greater than or equal to the count value th2, thereby more reliably determining that the moving object is more likely to use the image processing apparatus 1. The count value th2, which is the second predetermined time period, is used by the controller 10 typically in determining a moving object that is moving but may remain in front of the image processing apparatus 1 for a relatively long time. In contrast, the count value th1, which is the first predetermined time period, is used by the controller 10 typically in determining a moving object that is moving and approaching the image processing apparatus 1. Accordingly, it is preferable that the count value th2 be greater than the count value th1.

As described above, after the controller 10 enters the power-saving mode, the controller 10 returns to the normal mode when the first detector 12 or the second detector 13 has detected the moving object for a period of time greater than or equal to the count value th1, which is the first predetermined time period, and the first detector 12 and the second detector 13 have detected the moving object for a period of time greater than or equal to the count value th2, which is the second predetermined time period. By the processing, the image processing apparatus 1 further reliably determines that a moving object approaching the image processing apparatus 1 is likely to use the image processing apparatus 1 or is likely to just pass by the image processing apparatus 1, and thus the image processing apparatus 1 can appropriately return from the power-saving mode to the normal mode. When the first detector 12 and the second detector 13 detect that a moving object has moved for a period of time less than the count value th2, the second timer in the controller 10 more reliably determines that the moving object is less likely to use the image processing apparatus 1, for example, the moving object has just passed by in front of the image processing apparatus 1.

1-5. Example 2 of Returning from Power-Saving Mode to Normal Mode

Figure 5:
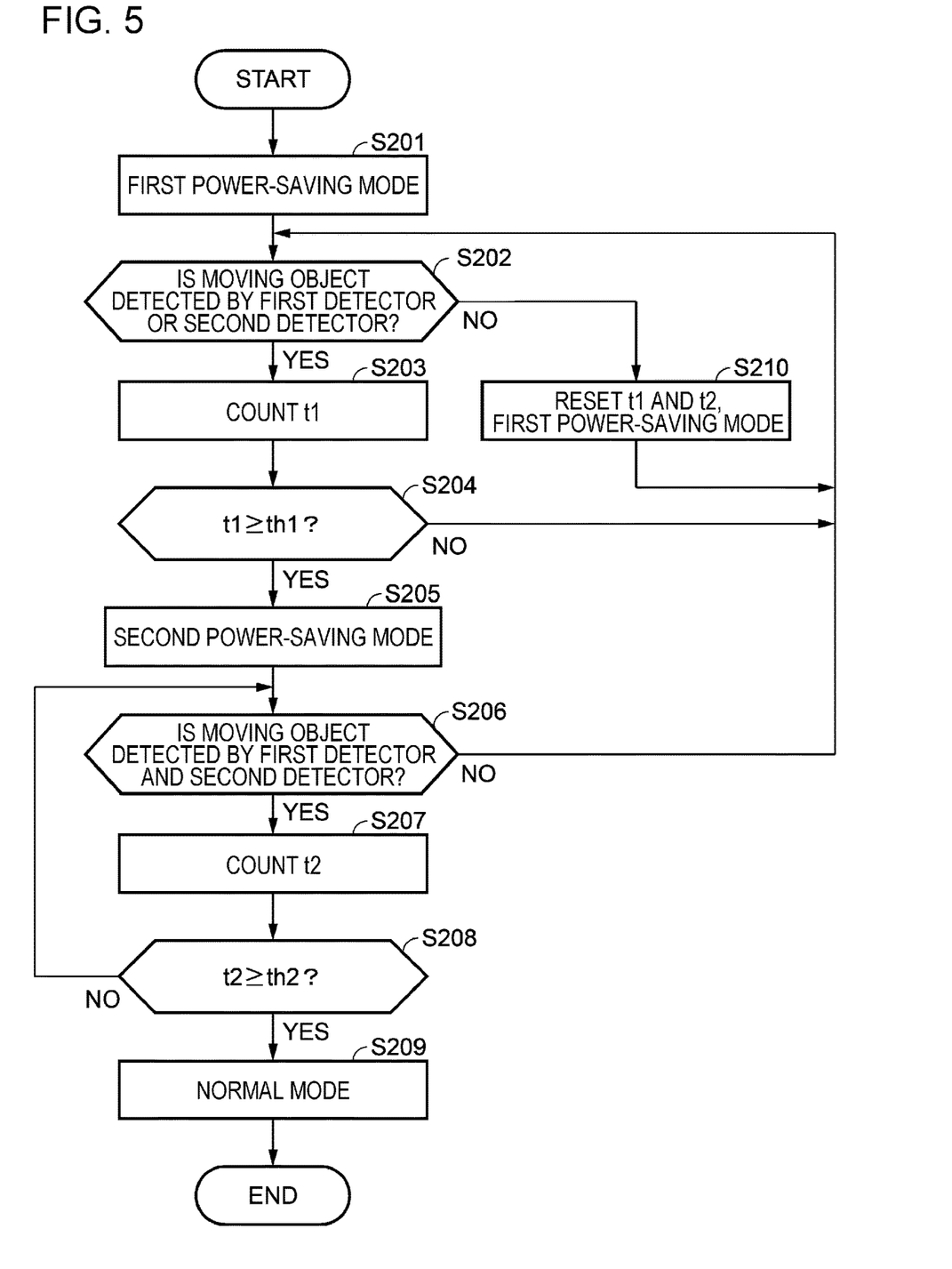
FIG. 5 is a flowchart illustrating processing for returning from a first power-saving mode to a second power-saving mode and to a normal mode.

An example in FIG. 5 differs from the example in FIG. 4 in that the controller 10 returns to the normal mode after entering two power-saving modes. More specifically, in this example, as a first power-saving mode and a second power-saving mode, it is assumed that the CPU in the controller 10 enters the Sleep mode, the Stop mode, or the Standby mode in decreasing order of power consumption, where the second power-saving mode consumes more power than the first power-saving mode. For example, when the second power-saving mode is the Sleep mode, the first power-saving mode is the Stop mode or the Standby mode. In the following description of FIG. 5, descriptions similar to those of FIG. 4 are omitted.

As illustrated in FIG. 5, the controller 10 switches to the first power-saving mode when no operation on the buttons on the detection panel of the UI section 16 is detected for a predetermined time or no print job is received by the communication section 17 for a predetermined time (S201). In this processing, the controller 10 may enter the first power-saving mode that consumes less power than the second power-saving mode.

The controller 10 determines whether a moving object is detected by the first detector 12 or the second detector 13 (S202). In response to detection of a moving object by the first detector 12 or the second detector 13 (S202: YES), the controller 10 reads the count value t1 by using the first timer (S203). The count value t1 indicates a time period for which the first detector 12 or the second detector 13 has been detecting a moving object. When no moving object is detected by the first detector 12 or the second detector 13 (S202: NO), the first timer resets the count values t1 and t2 when the count value t1 and the count value t2 have already been established (S210), and the processing returns to the control for determining whether a moving object is detected by the first detector 12 or the second detector 13 (S202).

The first timer compares the count value t1 with the count value th1, which is preset as described above (S204). In response to the first timer determining that the established count value t1 has reached the preset count value th1 and the count value t1≥the count value th1 (S204: YES), the controller 10 switches from the first power-saving mode to the second power-saving mode (S205).

In an example configuration for the controller 10 to implement the processing of switching from the first power-saving mode to the second power-saving mode, the first timer inputs an output signal as an interrupt signal to an interrupt terminal of the CPU in the controller 10. More specifically, when the first timer determines that the count value t1≥the count value th1, the first timer outputs an output signal as an interrupt signal to the interrupt terminal of the CPU to cause the CPU to perform interrupt processing for switching from the first power-saving mode to the second power-saving mode. By performing the interrupt processing, the CPU switches from the first power-saving mode and performs control to switch to the second power-saving mode, thereby switching from the first power-saving mode to the second power-saving mode.

Next, the controller 10 determines whether the moving object is detected by both the first detector 12 and the second detector 13 (S206). In response to detection of the moving object by the first detector 12 and the second detector 13 (S206: YES), the controller 10 reads the count value t2 by using the second timer (S207). The count value t2 indicates a time for which the first detector 12 and the second detector 13 have been detecting the moving object.

In response to the first timer determining that the established count value t1 has not reached the preset count value th1 and the count value t1<the count value th1 (S204: NO), the processing returns to the control for determining whether a moving object is detected by the first detector 12 or the second detector 13 (S202). In response to the first timer determining that the established count value t1 has reached the preset count value th1 and the count value t1≥the count value th1 (S204: YES), when the controller 10 determines that the moving object is not detected by the first detector 12 and the second detector 13 (S206: NO), the processing returns to the control for determining whether a moving object is detected by the first detector 12 or the second detector 13 (S202).

The second timer compares the count value t2 with the count value th2, which is preset as described above (S208). In response to the second timer determining that the established count value t2 has reached the preset count value th2 and the count value t2≥the count value th2 (S208: YES), the CPU in the controller 10 returns from the second power-saving mode to the normal mode, which is the Run mode (S209). Then, the controller 10 terminates the control.

In an example configuration for implementing the processing, the second timer inputs an output signal as an interrupt signal to the interrupt terminal of the CPU in the controller 10. More specifically, when the second timer determines that the count value t2≥the count value th2, the second timer outputs an output signal as an interrupt signal to the interrupt terminal of the CPU to cause the CPU to perform interrupt processing. The CPU performs the interrupt processing, thereby performing control for returning from the second power-saving mode to the normal mode, which is the Run mode.

In response to the second timer determining that the established count value t2 has not reached the preset count value th2 and the count value t2<the count value th2 (S208: NO), the processing returns to the control for determining whether the moving object is detected by both the first detector 12 and the second detector 13 (S206).

By the processing, the image processing apparatus 1 further reliably determines that a moving object approaching the image processing apparatus 1 is likely to use the image processing apparatus 1 or is likely to just pass by the image processing apparatus 1, and thus the image processing apparatus 1 can appropriately return from the power-saving mode to the normal mode. In addition, the controller 10 performs control such that the image processing apparatus 1 is switched to two power-saving modes and then returns to the normal mode depending on detection conditions of the first detector 12 and the second detector 13, appropriately reducing the power consumption and reducing the time required to return from the power-saving mode to the normal mode. As described above, the controller 10 tends to take more time to return from a power-saving mode to the normal mode as the power-saving mode consumes less power.

When starting the control, the controller 10 prioritizes reducing power consumption and enters the first power-saving mode, which consumes less power. In response to the first detector 12 or the second detector 13 detecting a moving object for a period of time greater than or equal to the count value th1, the controller 10 determines that the moving object is likely to use the image processing apparatus 1 and switches to the second power-saving mode that consumes more power but requires less time than the first power-saving mode to return to the normal mode. When the first detector 12 and the second detector 13 detect that the moving object has moved for a period of time greater than or equal to the count value th2, the controller 10 determines that the moving object is more likely to use the image processing apparatus 1 and returns to the normal mode. In this processing, the controller 10 enters the second power-saving mode, reducing time required to return to the normal mode compared with the first power-saving mode.

1-6. Example 3 of Returning from Power-Saving Mode to Normal Mode

Figure 6:
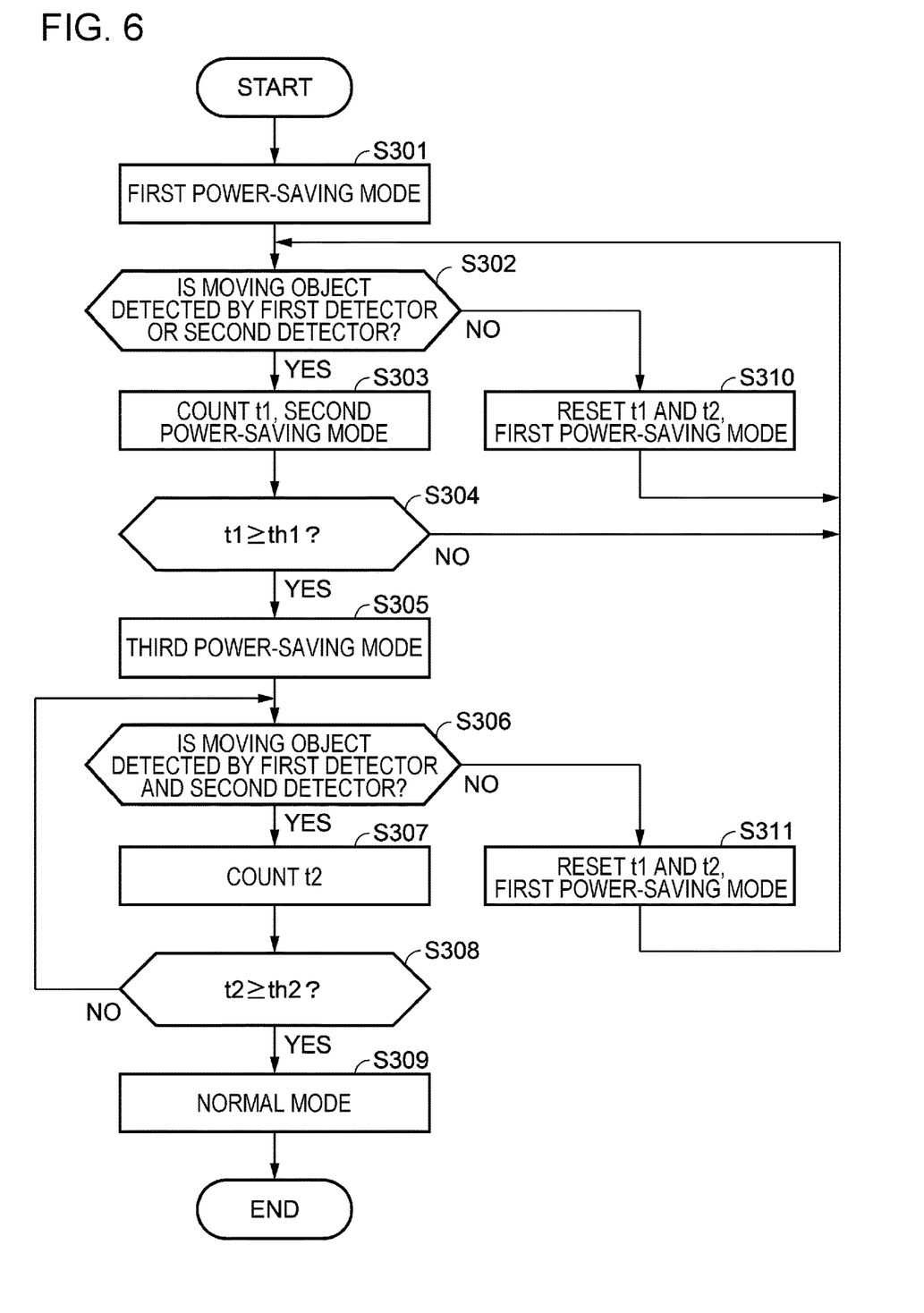
FIG. 6 is a flowchart illustrating processing for returning from a first power-saving mode to a second power-saving mode to a third power-saving mode and to a normal mode.

An example in FIG. 6 differs from the example in FIG. 4 in that the controller 10 returns to the normal mode after entering three power-saving modes. More specifically, in this example, it is assumed that the CPU in the controller 10 allocates the Standby mode, the Stop mode, and the Sleep mode in ascending order of power consumption to a first power-saving mode, a second power-saving mode, and a third power-saving mode, respectively. In the following description of FIG. 6, descriptions similar to those of FIG. 4 are omitted.

As illustrated in FIG. 6, the controller 10 switches to the first power-saving mode when no operation on the buttons on the detection panel of the UI section 16 is detected for a predetermined time or no print job is received by the communication section 17 for a predetermined time (S301). In this processing, the controller 10 enters the first power-saving mode that consumes the least power.

The controller 10 determines whether a moving object is detected by the first detector 12 or the second detector 13 (S302). In response to detection of a moving object by the first detector 12 or the second detector 13 (S302: YES), the first timer counts the count value t1 and switches to the second power-saving mode when the controller 10 is in the first power-saving mode (S303). The count value t1 indicates a time period for which the first detector 12 or the second detector 13 has been detecting the moving object.

In an example configuration for implementing the processing for switching from the first power-saving mode to the second power-saving mode, the controller 10 performs the logical OR operation on a detection signal of the first detector 12 and a detection signal of the second detector 13 by using a third logic circuit in a predetermined logic circuit in the controller 10. The controller 10 outputs an output result, which is at the high level, as an interrupt signal to an interrupt terminal of the CPU, thereby causing the CPU to perform interrupt processing for switching from the first power-saving mode to the second power-saving mode. By performing the interrupt processing, the CPU switches from the first power-saving mode and performs control to switch to the second power-saving mode, thereby switching from the first power-saving mode to the second power-saving mode.

When starting the control, the controller 10 prioritizes reducing power consumption and enters the first power-saving mode, which consumes the least power. Next, in response to the first detector 12 or the second detector 13 detecting a moving object, the controller 10 determines that the moving object is likely to use the image processing apparatus 1 and switches to the second power-saving mode that consumes more power but requires less time than the first power-saving mode to return to the normal mode. While the controller 10 switches from the first power-saving mode to the second power-saving mode, power is supplied to the first timer, and thus the first timer can continue the counting.

When no moving object is detected by the first detector 12 or the second detector 13 (S302: NO), when the first timer has already established the count value t1 and the second timer has already established the count value t2, the first timer and the second timer reset the count values t1 and t2, and when the controller 10 is in the second power-saving mode, the controller 10 switches to the first power-saving mode (S310). After the processing, the controller 10 returns to the control for determining whether a moving object is detected by the first detector 12 or the second detector 13 (S302).

In an example configuration for implementing the processing for switching from the second power-saving mode to the first power-saving mode, the controller 10 performs a logical NOR operation on a detection signal of the first detector 12 and a detection signal of the second detector 13 by using a fourth logic circuit in a predetermined logic circuit in the controller 10. The controller 10 outputs an output result, which is at the high level, as an interrupt signal to an interrupt terminal of the CPU, thereby causing the CPU to perform interrupt processing for switching from the first power-saving mode to the second power-saving mode. By performing the interrupt processing, the CPU switches from the second power-saving mode and performs control to switch to the first power-saving mode, thereby switching from the second power-saving mode to the first power-saving mode.

The first timer compares the count value t1 with the count value th1, which is preset as described above (S304). In response to the first timer determining that the established count value t1 has reached the preset count value th1 and the count value t1≥the count value th1 (S304: YES), the controller 10 switches from the second power-saving mode to the third power-saving mode (S305).

In an example configuration for the controller 10 to implement the processing of switching from the second power-saving mode to the third power-saving mode, the first timer inputs an output signal as an interrupt signal to the interrupt terminal of the CPU in the controller 10. More specifically, when the first timer determines that the count value t1≥the count value th1, the first timer outputs an output signal as an interrupt signal to the interrupt terminal of the CPU to cause the CPU to perform interrupt processing for switching from the second power-saving mode to the third power-saving mode. By performing the interrupt processing, the CPU switches from the second power-saving mode and performs control to switch to the third power-saving mode, thereby switching from the second power-saving mode to the third power-saving mode.

Next, the controller 10 determines whether the moving object is detected by both the first detector 12 and the second detector 13 (S306). In response to detection of the moving object by the first detector 12 and the second detector 13 (S306: YES), the controller 10 reads the count value t2 by using the second timer (S307). The count value t2 indicates a time period for which the first detector 12 and the second detector 13 have been detecting the moving object.

When the first timer determines that the established count value t1 has not reached the preset count value th1 and the count value t1<the count value th1 (S304: NO), the processing returns to the control for determining whether a moving object is detected by the first detector 12 or the second detector 13 (S302). When the first timer determining that the established count value t1 has reached the preset count value th1 and the count value t1≥the count value th1 (S304: YES), when the controller 10 determines that the moving object is not detected by the first detector 12 and the second detector 13 (S306: NO), and when the first timer has already established the count value t1 and the second timer has already established the count value t2, the first timer and the second timer reset the count values t1 and t2, and when the controller 10 is in the second power-saving mode, the controller 10 switches to the first power-saving mode (S311). After the processing, the controller 10 returns to the control for determining whether a moving object is detected by the first detector 12 or the second detector 13 (S302).

The second timer compares the count value t2 with the count value th2, which is preset as described above (S308). In response to the second timer determining that the established count value t2 has reached the preset count value th2 and the count value t2≥the count value th2 (S308: YES), the CPU in the controller 10 returns from the third power-saving mode to the normal mode, which is the Run mode (S309). Then, the controller 10 terminates the control.

In an example configuration for implementing the processing, the second timer inputs an output signal as an interrupt signal to the interrupt terminal of the CPU in the controller 10. More specifically, when the second timer determines that the count value t2≥the count value th2, the second timer outputs an output signal as an interrupt signal to the interrupt terminal of the CPU to cause the CPU to perform interrupt processing. The CPU performs the interrupt processing, thereby performing control for returning from the third power-saving mode to the normal mode, which is the Run mode.

In response to the second timer determining that the established count value t2 has not reached the preset count value th2 and the count value t2<the count value th2 (S308: NO), the processing returns to the control for determining whether the moving object is detected by both the first detector 12 and the second detector 13 (S306).

By the processing, the image processing apparatus 1 further reliably determines that a moving object approaching the image processing apparatus 1 is likely to use the image processing apparatus 1 or is likely to just pass by the image processing apparatus 1, and thus the image processing apparatus 1 can appropriately return from the power-saving mode to the normal mode. In addition, the controller 10 performs control such that the image processing apparatus 1 is switched to the three power-saving modes and then returns to the normal mode depending on detection conditions from the first detector 12 and the second detector 13, appropriately reducing the power consumption and reducing the time required to return from the power-saving mode to the normal mode.

As described above, the controller 10 tends to take more time to return from a power-saving mode to the normal mode as the power-saving mode consumes less power. When starting the control, the controller 10 prioritizes reducing power consumption and enters the first power-saving mode, which consumes less power. In response to the first detector 12 or the second detector 13 detecting a moving object, the controller 10 determines that the moving object is likely to use the image processing apparatus 1 and switches to the second power-saving mode that consumes more power but requires less time to return to the normal mode than the first power-saving mode. In response to the first detector 12 or the second detector 13 detecting a moving object for a period of time greater than or equal to the count value th1, the controller 10 determines that the moving object is more likely to use the image processing apparatus 1 and switches to the third power-saving mode that consumes more power but requires less time to return to the normal mode than the second power-saving mode. When the first detector 12 and the second detector 13 detect that the moving object has moved for a period of time greater than or equal to the count value th2, the controller 10 determines that the moving object is quite likely to use the image processing apparatus 1 and returns to the normal mode. In this processing, the controller 10 enters the third power-saving mode, minimizing time required to return to the normal mode.

When the controller 10 starts the control processing and enters the first power-saving mode (S301), the controller 10 prioritizes reducing power consumption and controls the power supply section 18 such that power supply is stopped to both the reading section 15 and the print section 14. In the first power-saving mode, the controller 10 disables the operations of the print section 14 and the reading section 15. In the first power-saving mode, the controller 10 disables printing operation of the print section 14 and document reading operation of the reading section 15.

In response to detection of a moving object by the first detector 12 or the second detector 13 (S302: YES), the controller 10 switches from the first power-saving mode to the second power-saving mode in the interrupt processing on the CPU (S303) while controlling the power supply section 18 such that power supply to the reading section 15 is started. In the second power-saving mode, the controller 10 enable the reading section 15 to operate. In other words, after the controller 10 enters the first power-saving mode, when a moving object is detected by the first detector 12 or the second detector 13 and the controller 10 switches to the second power-saving mode, the controller 10 enables reading operation of the reading section 15.

When the first detector 12 or the second detector 13 detects a moving object, the controller 10 determines that the moving object is likely to use the image processing apparatus 1 and starts power supply to the reading section 15 to further reduce time required to return to the normal mode. The controller 10 may start power supply to the print section 14 instead of the reading section 15. The controller 10 may enable the print section 14 to perform printing in switching to the second power-saving mode.

As described above, the image processing apparatus 1 according to the embodiment can more reliably determine that a moving object approaching the image processing apparatus 1 is likely to use the image processing apparatus 1 or is likely to just pass by the image processing apparatus 1, and thus the image processing apparatus 1 can appropriately return from the power-saving mode to the normal mode.

While the embodiments have been described in detail with reference to the drawings, it is to be understood that the specific configurations are not limited to these configurations according to the embodiments, and some configurations may be modified, replaced, or omitted without departing from the scope of the disclosure. The ink jet head that uses ink has been described as an example of the print section 14 in the image processing apparatus 1; however, the print section 14 of another type may be employed. For example, the print section 14 may be an electrophotographic-type that uses a toner. In the description above, the UI section 16 is a touch panel display; however, the display section may be a liquid crystal display or an organic electro luminescence (EL) display, and may be additionally provided with a keyboard, a mouse, and other components as input sections. The power-saving mode may be any state of any component depending on power consumption. The detection section according to the embodiments includes the first detector 12 and the second detector 13; however, the detection section may include any number of components. The controller 10 may perform the above-described control when detection is made by the first detector 12 or the second detector 13 or by a plurality of detections sections. The timer in the controller 10 includes the first timer and the second timer; however, the timer may be a single timer. Even if the timer is a single timer, the single timer is capable of resetting counting when the counting ends and starting the next counting. When the controller 10 controls a plurality of power-saving modes, the controller 10 may use any mode for respective power-saving modes such that power is supplied or not to the reading section 15, power is supplied or not to the print section 14, and the CPU is caused to enter a power-saving mode, and any combination of the conditions may be used.

It should be noted that a program for implementing the function of any component in the above-described image processing apparatus 1 may be recorded on a computer-readable storage medium, and the program may be loaded into a computer system and implemented. The apparatus may be, for example, the image processing apparatus 1 or the external device 2. The "computer system" here includes an operating system (OS) or hardware such as a peripheral device. The "computer-readable storage medium" is a portable medium such as a flexible disk, a magneto-optical disk, a read-only memory (ROM), or a compact disk (CD)-ROM, or a storage device that is built into the computer system such as a hard disk. In addition, the "computer-readable storage medium" may be a medium that can store a program for a certain period of time such as a volatile memory in a server or in a computer system that is a client when a program is transmitted through a network such as the Internet or a communications line such as a telephone line.

The program may be transmitted from a computer system that stores the program in a storage device or the like to another computer system via a transmission medium or by transmission waves in a transmission medium. The "transmission medium" that transmits the program here is a medium that has a function of transmitting information, for example, a network such as the Internet or a communications line such as a telephone line. The program may implement part of the functions described above. The program may be a program that can implement the functions described above in combination with a program that has already been stored in a computer system, that is, a difference file or a difference program.

What is claimed is:

1. An image processing apparatus comprising:
    a print section configured to perform printing on a recording medium;
    a first detector configured to detect a moving object within a first detection range;
    a second detector configured to detect the moving object within a second detection range, a width of the first detection range and a width of the second detection range being substantially the same; and
    a controller configured to switch between a normal mode in which printing by the print section is enabled and a power-saving mode in which printing by the print section is disabled, wherein
    the controller returns to the normal mode when,
    after the controller enters the power-saving mode,
    in response to detection of the moving object by the first detector or the second detector, the first detector or the second detector detects the moving object for a first predetermined period of time or more, and
    the first detector and the second detector detect the moving object for a second predetermined period of time or more.

2. The image processing apparatus according to claim 1, wherein the range within which the first detector and the second detector detect the moving object is an overlap detection range in which the first detection range of the first detector and the second detection range of the second detector overlap, and
    when the controller switches from the power-saving mode to the normal mode, the first detector or the second detector that has first detected the moving object detects the moving object continuously within a range including the overlap detection range.

3. The image processing apparatus according to claim 1, further comprising:
    a display section, wherein
    one of the first detector and the second detector is disposed on a side to a left of or on a side to a right of the display section; and
    the other one of the first detector and the second detector is disposed on the other side of the side to the left of or side to the right of the display section.

4. The image processing apparatus according to claim 1, wherein the moving object is a person, and the first detector and the second detector are motion sensors.

5. The image processing apparatus according to claim 1, wherein, in the power-saving mode, the controller is configured to be switched to a first power-saving mode or a second power-saving mode that consumes more power than the first power-saving mode, and
    after the controller is switched to the first power-saving mode, in response to detection of the moving object by the first detector or the second detector, the controller is switched to the second power-saving mode.

6. The image processing apparatus according to claim 5, further comprising:
    a reading section configured to read a document, wherein
    the controller is configured to disable a document reading operation by the reading section in the first power-saving mode and to enable the document reading operation by the reading section in the second power-saving mode.

7. A method of controlling an image processing apparatus including a print section configured to perform printing on a recording medium, a first detector configured to detect a moving object within a first detection range, and a second detector configured to detect the moving object within a second detection range, the method comprising:
    entering a power-saving mode in which printing by the print section is disabled;
    after detection of the moving object by the first detector within the first detection range having a first width or the second detector within the second detection range having a second width, the first width and the second width being substantially the same, the first detector or the second detector detecting the moving object for a first predetermined period of time or more, and in response to the first detector and the second detector detecting the moving object for a second predetermined period of time or more, entering a normal mode in which printing by the print section is enabled.

* * * * *